(12) United States Patent
Ohga

(10) Patent No.: US 8,081,819 B2
(45) Date of Patent: Dec. 20, 2011

(54) COLOR PROCESSING METHOD AND APPARATUS

(75) Inventor: Manabu Ohga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1031 days.

(21) Appl. No.: 11/914,602

(22) PCT Filed: Jun. 8, 2006

(86) PCT No.: PCT/JP2006/311965
§ 371 (c)(1), (2), (4) Date: Nov. 16, 2007

(87) PCT Pub. No.: WO2006/137312
PCT Pub. Date: Dec. 28, 2006

(65) Prior Publication Data
US 2009/0052771 A1   Feb. 26, 2009

(30) Foreign Application Priority Data
Jun. 22, 2005 (JP) ................. 2005-182521

(51) Int. Cl.
  *G06K 9/00* (2006.01)
  *G03F 3/08* (2006.01)
  *G09G 5/02* (2006.01)
(52) U.S. Cl. .......... 382/167; 358/518; 345/601
(58) Field of Classification Search .......... None
  See application file for complete search history.

(56) References Cited

U.S. PATENT DOCUMENTS

| | | | |
|---|---|---|---|
| 5,754,682 A | 5/1998 | Katoh | 382/162 |
| 6,373,531 B1 | 4/2002 | Hidaka et al. | 348/603 |
| 6,542,634 B1 | 4/2003 | Ohga | 382/167 |
| 6,850,640 B2 | 2/2005 | Ohga | 382/162 |
| 6,987,519 B2 | 1/2006 | Kumada et al. | 345/603 |
| 6,990,232 B2 | 1/2006 | Ohga | 382/162 |
| 6,999,617 B1 | 2/2006 | Ohga | 382/167 |
| 7,027,067 B1 | 4/2006 | Ohga et al. | 345/589 |
| 7,035,454 B2 | 4/2006 | Kumada et al. | 382/162 |
| 7,190,372 B2 * | 3/2007 | Choi et al. | 345/589 |
| 7,230,737 B1 | 6/2007 | Ohga | 358/1.9 |
| 7,277,200 B2 * | 10/2007 | Ohga | 358/1.9 |
| 7,830,566 B2 * | 11/2010 | Yamada et al. | 358/518 |
| 2002/0039103 A1 * | 4/2002 | Kumada et al. | 345/593 |
| 2003/0053094 A1 | 3/2003 | Ohga et al. | 358/1.9 |
| 2007/0236759 A1 | 10/2007 | Ohga | 358/518 |

FOREIGN PATENT DOCUMENTS

| | | |
|---|---|---|
| EP | 974934 A2 * | 1/2000 |
| JP | 9-46535 | 2/1997 |
| JP | 9-93451 | 4/1997 |
| JP | 9-102882 | 4/1997 |
| JP | 2000-050086 | 2/2000 |
| JP | 2000-50086 A | 2/2000 |
| JP | 2000-050088 | 2/2000 |
| JP | 2000-050089 | 2/2000 |

\* cited by examiner

*Primary Examiner* — Samir Ahmed
*Assistant Examiner* — Li Liu
(74) *Attorney, Agent, or Firm* — Fitzpatrick, Cella, Harper & Scinto

(57) ABSTRACT

In order to implement color matching with higher precision, a device that handles object colors and a device that handles light-source colors must be separately processed. Hence, when the device type is a device that handles light-source colors, control is made so as not to perform processing (forward color appearance model conversion and inverse color appearance model conversion) for converting colorimetric conditions of a colorimetric value file into viewing conditions. When the device type is a device that handles object colors, the processing for converting the colorimetric conditions of the colorimetric value file into the viewing conditions is performed, and a profile is created from the colorimetric values.

6 Claims, 15 Drawing Sheets

COLOR PROCESSING METHOD AND APPARATUS

TECHNICAL FIELD

The present invention relates to color processing that performs color matching processing according to the viewing conditions.

BACKGROUND ART

FIG. 1 is a conceptual view of general color matching.

Input data as RGB data is converted into XYZ data on a device-independent color space by an input profile. Since colors outside the color gamut of an output device cannot be expressed by the output device, the input data converted into data on the device-independent color space undergoes gamut mapping, so that all such colors fall within the color reproduction range of the output device. After gamut mapping, the input data is converted from the data on the device-independent color space into CMYK data on a color space depending on the output device.

In color matching, a reference white point and ambient light are fixed. For example, in profiles specified by International Color Consortium (ICC), the Profile Connection Space (PCS) that connects profiles are defined by XYZ values and Lab values of the D50 reference. For this reason, upon viewing an input document or printout under a light source with the D50 characteristics, correct color reproduction is guaranteed. Under light sources with other characteristics, correct color reproduction is not guaranteed.

In consideration of this, the present applicant has proposed color matching according to the viewing conditions (Japanese Patent Laid-Open No. 2000-50086). This proposal is color matching that uses forward color appearance conversion according to the viewing conditions on the source side, and inverse color appearance conversion according to the viewing conditions on the destination side.

However, since the technique disclosed in Japanese Patent Laid-Open No. 2000-50086 (U.S. Pat. No. 6,542,634) performs processing without distinguishing a device which handles object colors and that which handles light-source colors, there is room for improvement so as to implement color matching with higher precision.

DISCLOSURE OF INVENTION

The first aspect of the present invention discloses a color processing method of performing color matching processing as correction processing using viewing conditions and color conversion conditions calculated from colorimetric values of a device, the method comprising the steps of:

obtaining the viewing conditions;

converting colorimetric conditions of the colorimetric values into the viewing conditions;

determining a type of the device; and controlling the conversion step based on a determination result of the determination step, wherein the control step includes a step of controlling the conversion step so as not to perform the conversion when the type of the device is a device that handles light-source colors, and controlling the conversion step so as to perform the conversion when the type of the device is a device that handles object colors.

The second aspect of the present invention discloses a color processing method comprising the steps of:

creating a first profile using XYZ values of an ambient light reference for a device that handles object colors, wherein the first creation step includes a step of using a white point of ambient light as a white point of viewing conditions; and creating a second profile using XYZ values of a display device light source reference for a device that handles light-source colors, wherein the second creation step includes a step of using, as a white point of the viewing conditions, a white point of a display device when an observer gazes at an image on the display device, and a white point between a white point of the display device and a white point of the ambient light when the observer compares an image on the display device with an image on a reflecting document.

According to the present invention, conversions respectively suited to a device which handles object colors and that which handles light-source colors can be attained, thus implementing color matching with higher precision.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

Image processing according to preferred embodiments of the present invention will be described in detail hereinafter with reference to the accompanying drawings.

Figure 1:
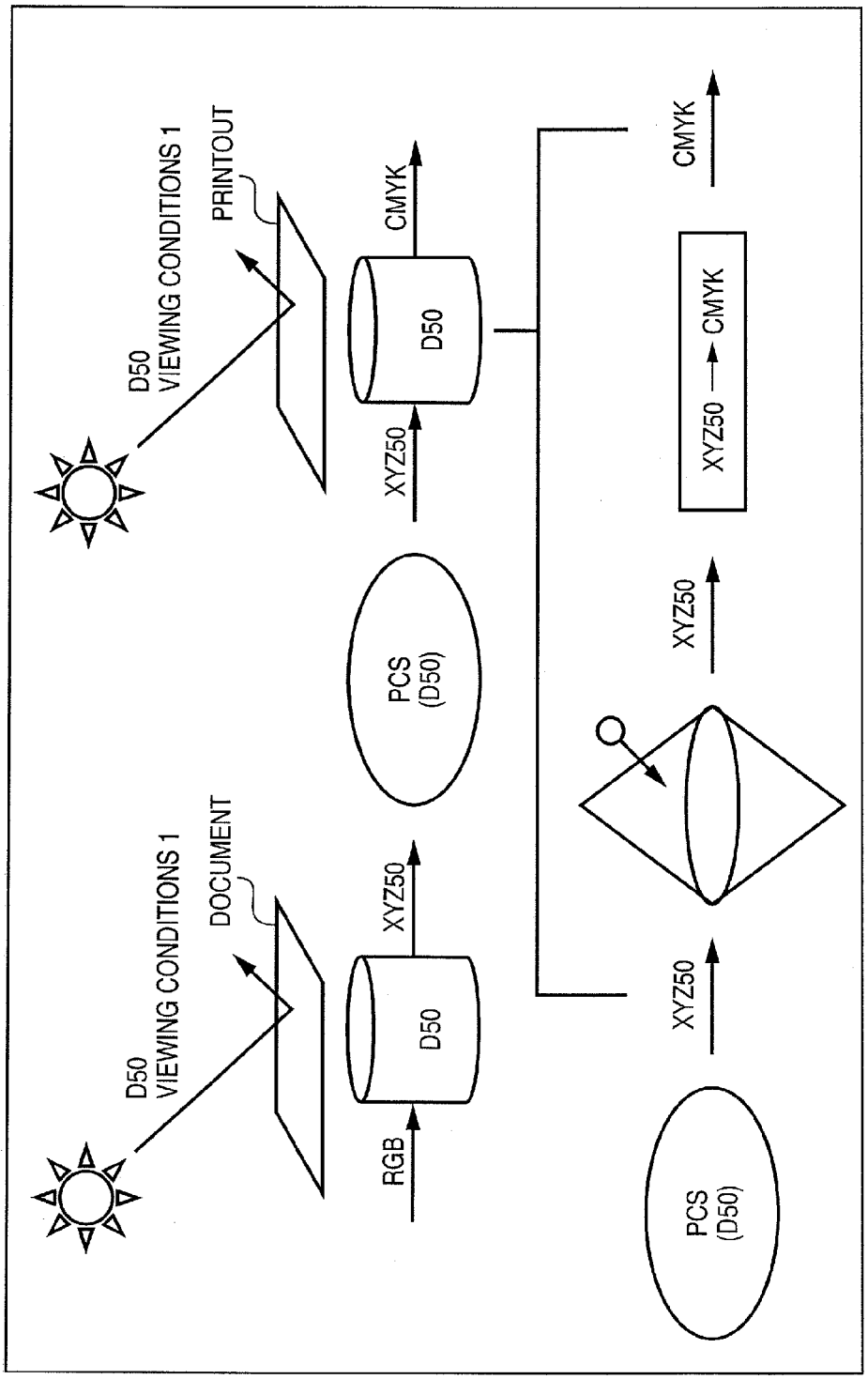
FIG. 1 is a conceptual view of general color matching.
Figure 2:
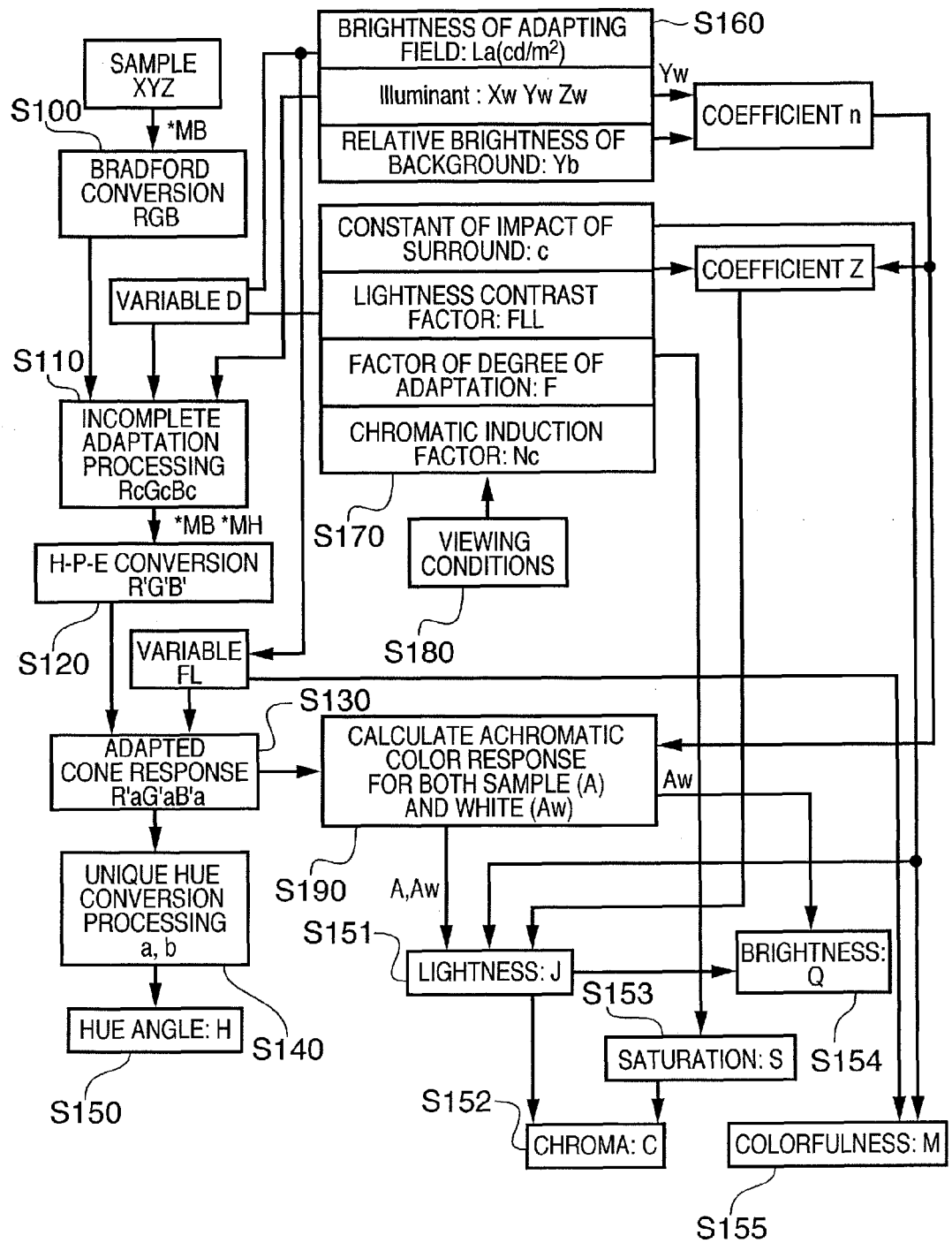
FIG. 2 a view for explaining a color appearance model used in a embodiment of the present invention.

A color appearance model used in an embodiment to be described hereinafter will be described first using FIG. 2.

As is known, colors perceived by a human ocular system result in different color appearance depending on various conditions such as a difference in illuminating light, the background on which a stimulus such as a viewing subject is placed, and the like even when light entering the eye remains the same.

For example, white illuminated by an incandescent lamp does not appear as red as the characteristics of light entering the eye, and is perceived as white. Of white placed on a black background and that placed on a bright background, white placed on the black background looks brighter. The former phenomenon is known as "color adaptation", and the latter one is known as "contrast". For this reason, a color must be displayed using a quantity corresponding to the degree of physiological activity of photoreceptor cells distributed on a retina. For this purpose, a color appearance model has been developed. The Commission Internationale de l'Eclairage (CIE) recommends use of CIECAM97s and CIECAM02. This color appearance model uses physiological three primary colors of chromatic vision. For example, H (hue), J (lightness), and C (chroma) values or H (hue), Q (brightness), and M (colorfulness) values as correlation values of color appearance calculated by CIECAM97s are considered as a color display method independent from the viewing conditions. By reproducing colors so that H, J, and C values or H, Q, and M values match between devices, different viewing conditions of input and output images can be compensated.

The processing contents of forward conversion of the color appearance model CIECAM97s which performs correction processing (processing for converting XYZ into HJC or HQM) according to the viewing conditions upon viewing an input image will be described below using FIG. 2.

As viewing condition information of an input image, the following values are set in step S160:

brightness La (cd/m$^2$) of the adapting field;

XYZ as relative tristimulus values of a sample under the light-source conditions;

XwYwZw as relative tristimulus values of white light under the light-source conditions; and Yb as relative brightness of the background under the light-source conditions.

Also, based on the type of viewing conditions designated in step S180, a constant c indicating the impact of surround, a chromatic induction factor Nc, a lightness contrast factor FLL, and a factor F of a degree of adaptation are set in step S170.

Based on the input image viewing condition information set in steps S160 and S170, the following processing is applied to XYZ values representing the input image.

Based on three primary colors of Bradford considered as physiological three primary colors of a human being, XYZ values are converted to obtain Bradford cone response values RGB (S100). Since human visual perception is not always completely adaptable to a viewing light source, a variable D indicating the degree of adaptation is calculated based on the brightness level and ambient conditions (La and F). Based on this variable D and XwYwZw values, incomplete adaptation processing is applied to the RGB values to convert them into RcGcBc values (S110).

Next, based on Hunt-Pointer-Estevez three primary colors considered as physiological three primary colors of a human being, the RcGcBc values are converted to calculate Hunt-Pointer-Estevez cone response values R'G'B' (S120). The degrees of adaptation of the R'G'B' values based on stimulus intensity level are estimated to calculate adapted cone response values R'aG'aB'a according to both the sample and white (S130). In step S130, nonlinear response compression is made using a variable FL calculated based on the brightness La of the adapting field.

Subsequently, in order to obtain the correlation with color perception, the following processing is executed.

Red-green and yellow-blue opposite color response values ab are calculated from the R'aG'aB'a values (S140), and hue H is calculated from the opposite color response values ab and an eccentricity factor (S150).

A background inducing coefficient n is calculated from Yw and the relative brightness Yb of the background, and achromatic color response values A and Aw associated with both the sample and white are calculated using this background inducing coefficient n (S190). Next, lightness J is calculated based on a coefficient z calculated from the background inducing coefficient n and lightness contrast factor FLL, and A, Aw, and c (S151). Subsequently, saturation S is calculated from the chromatic induction factor Nc (S153), chroma C is calculated from saturation S and lightness J (S152), and brightness Q is calculated from lightness J and white achromatic color response Aw (S154).

Also, colorfulness M is calculated from the variable FL and the constant c indicating the impact of surround (S155).

[Color Matching of Device that Handles Object Colors]

Color matching processing between devices (digital camera, scanner, printer, and the like) that handle the object colors of reflecting documents and the like will be described below.

Figure 3:
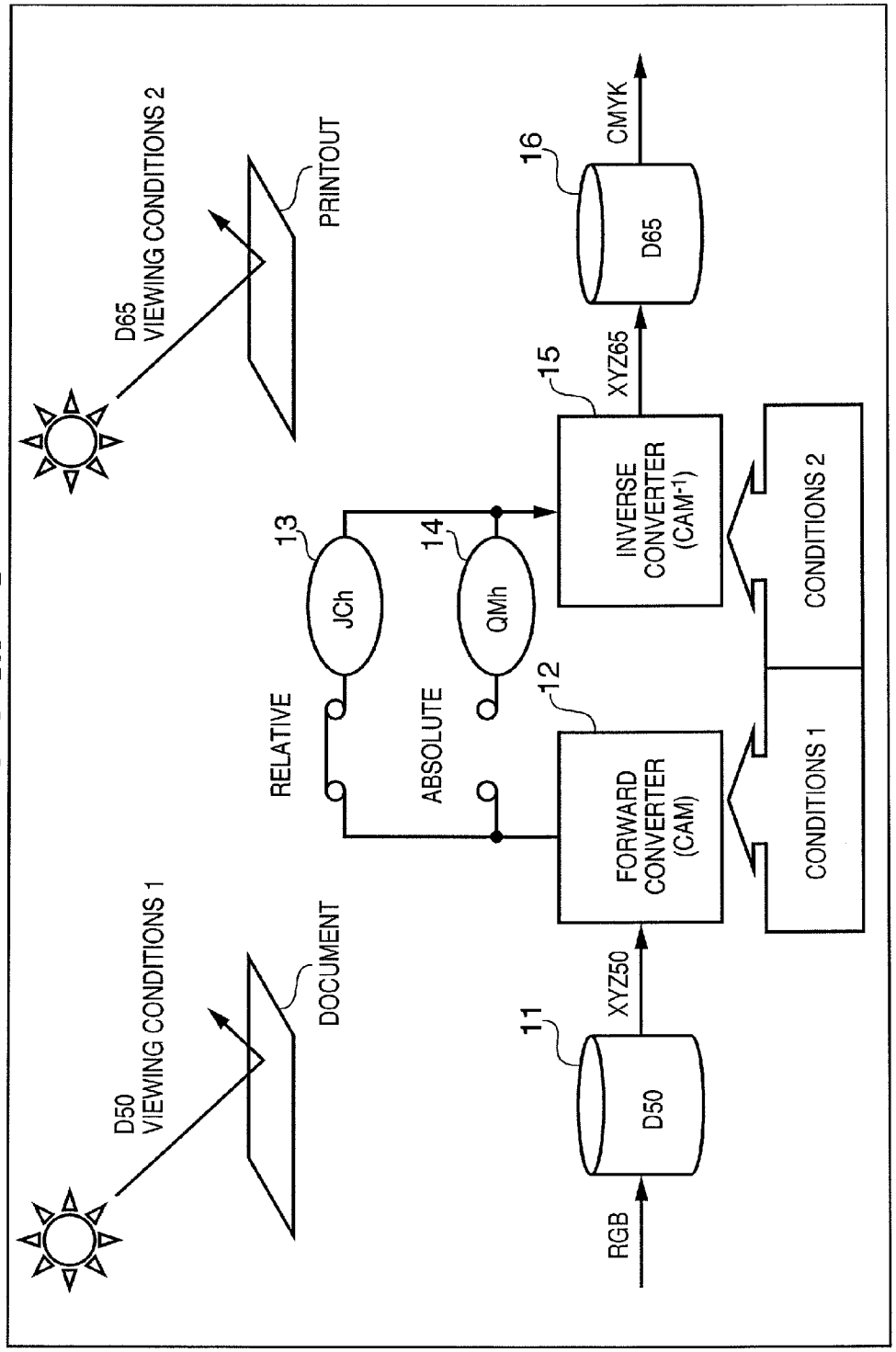
FIG. 3 is a view for explaining color matching processing that handles object colors.

FIG. 3 is a view for explaining color matching processing that handles object colors.

In FIG. 3, a conversion matrix or conversion lookup table (LUT) 11 converts data depending on an input device into device-independent color space data based on the white point reference of ambient light on the input side. A forward converter (CAM) 12 of the color appearance model converts the data obtained from the conversion LUT 11 into data on a human color appearance space JCh or QMh. JCh (or JCH) 13 is a color appearance space relative to reference white of ambient light. QMh (or QMH) 14 is an absolute color appearance space whose dimensions change depending on the illuminance level. An inverse converter (CAM$^{-1}$) 15 of the color appearance model converts the color space data of the human color appearance space JCh or QMh into device-independent color space data based on the white point reference of ambient light on the output side. A conversion LUT 16 converts the data obtained from the inverse converter 15 into color space data depending on an output device.

In general, a white point of ambient light under the viewing conditions is different from that of a standard light source upon measuring a color target, color patch, or the like. For example, the standard light source used upon colorimetry is D50 or D65. However, ambient light upon actually viewing an image is not always D50 or D65 in a light booth, but is normally illuminating light of an incandescent lamp, fluorescent lamp, or the like, or light obtained by mixing illuminating light and sunlight. In the following description, assume that the light source characteristics of ambient light under the viewing conditions are D50, D65, and D93 for the sake of simplicity. However, in practice, the XYZ values of a white point on a medium are set as a white point.

Figure 4:
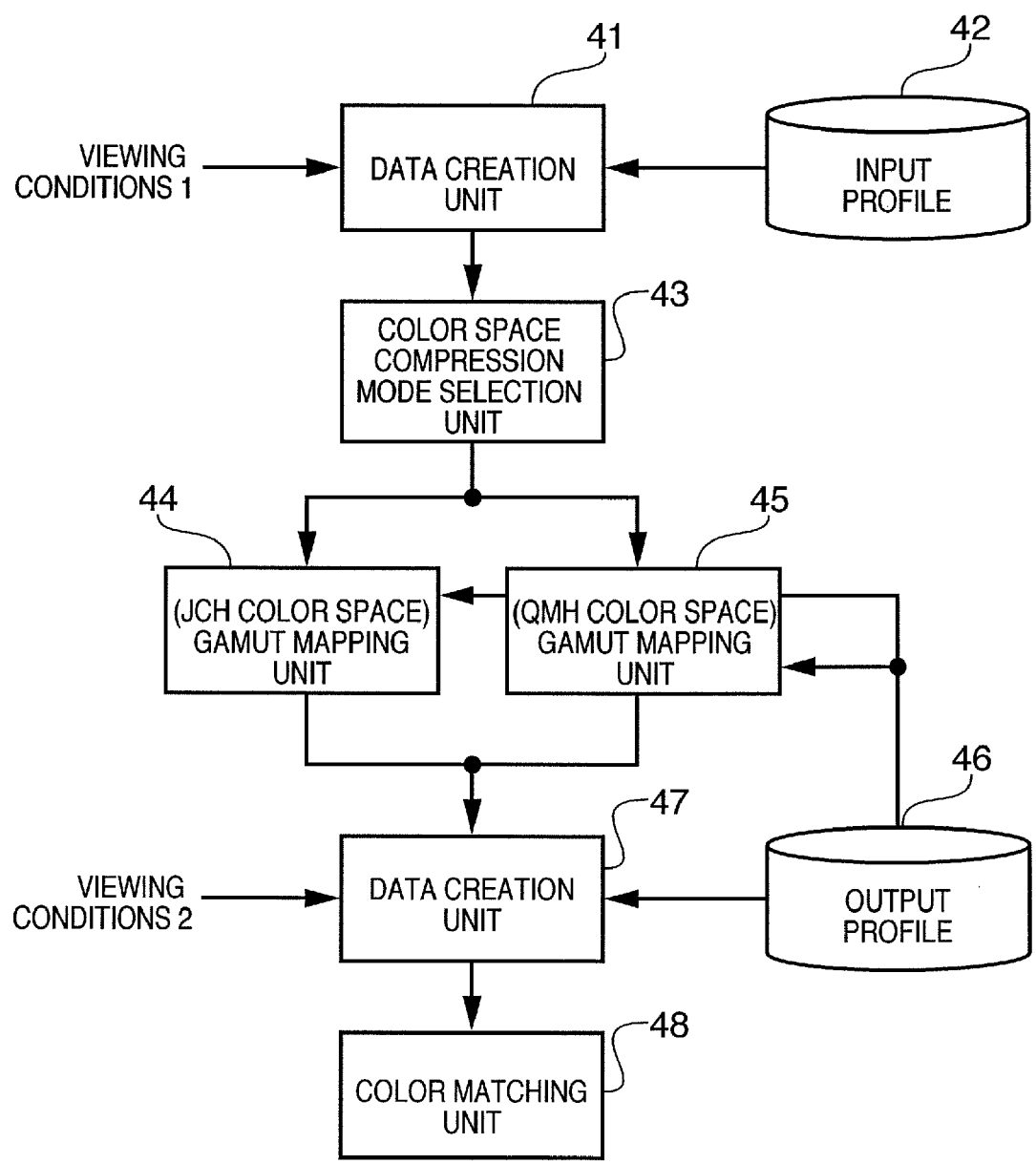
FIG. 4 is a block diagram showing the functional arrangement of the embodiment.

FIG. 4 is a block diagram showing the functional arrangement of this embodiment.

Referring to FIG. 4, a data creation unit 41 creates data depending on viewing conditions 1 on the input side based on an input profile 42 and viewing conditions 1 on the input side. A color space compression mode selection unit 43 selects based on designation by the user or profile whether gamut mapping is to be done on the JCH or QMH color space. Each of gamut mapping units 44 and 45 performs gamut mapping of data on the JCH or QMH color appearance space based on an output profile 46. A data creation unit 47 creates data depending on viewing conditions 2 on the output side based on the output profile 46 and viewing conditions 2 on the output side. A color matching unit 48 performs color matching by utilizing the data depending on viewing conditions 1, gamut mapping data, data depending on viewing conditions 2, and color appearance model.

Figure 5:
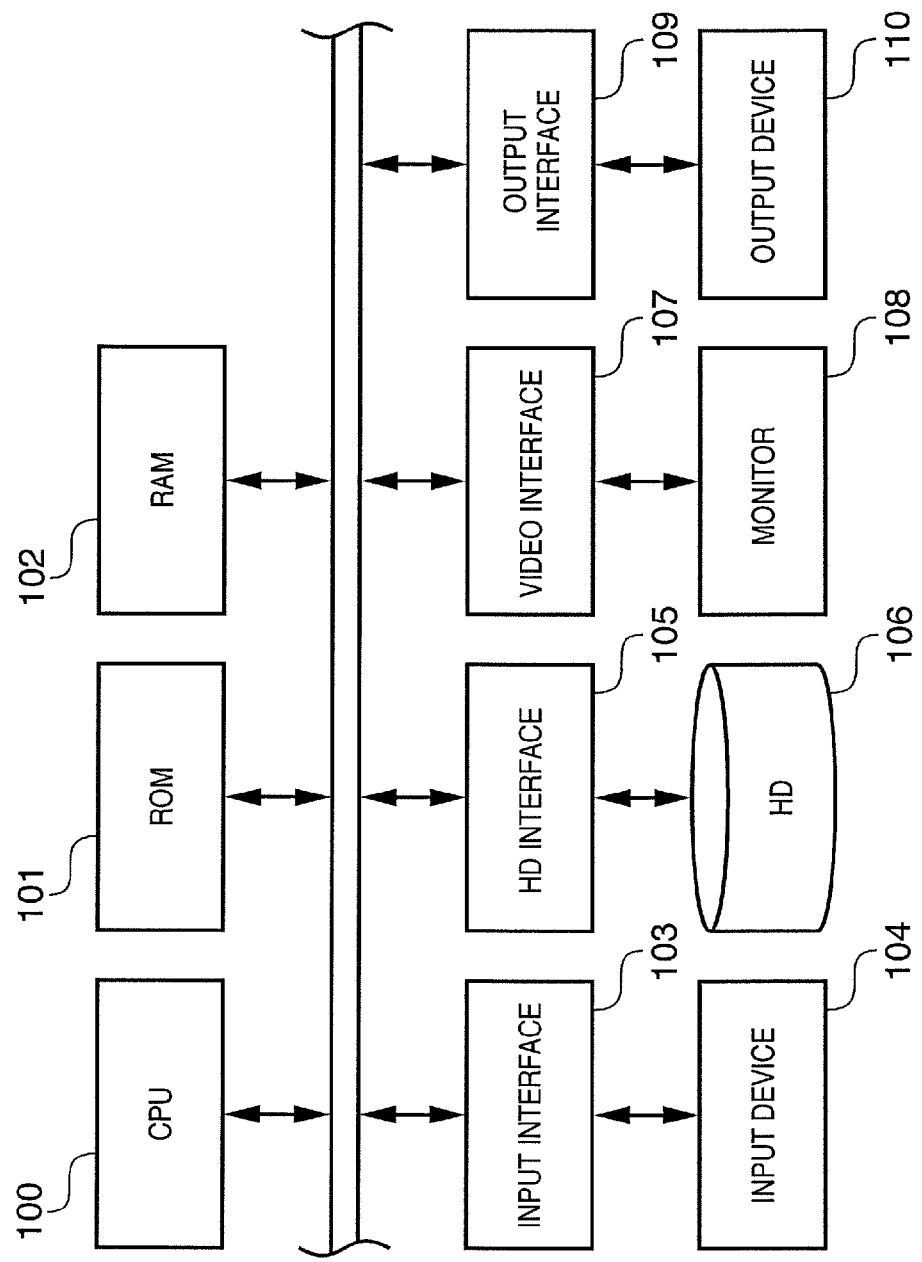
FIG. 5 is a block diagram showing the arrangement of an apparatus which implements the functional arrangement shown in FIG. 4.

FIG. 5 is a block diagram showing the arrangement of an apparatus which implements the functional arrangement shown in FIG. 4. Needless to say, the apparatus as shown in FIG. 5 is implemented by supplying software that implements the functions shown in FIG. 4 to a general-purpose computer apparatus such as a personal computer or the like. In this case, the software that implements the functions of this embodiment may be included in an operating system (OS) of the computer apparatus or in driver software of input and output devices independently of the OS.

Referring to FIG. 5, a CPU 100 controls the operation of the overall apparatus in accordance with programs stored in a ROM 101, hard disk (HD) 106, and the like using a RAM 102 as a work memory. Furthermore, the CPU 100 executes various kinds of processing including the aforementioned processing associated with color matching. An input interface 103 is an interface for connecting an input device 104. A hard disk interface 105 is an interface for connecting the HD 106. A video interface 107 is an interface for connecting a monitor 108. An output interface 109 is an interface for connecting an output device 110.

Note that the target input device of this embodiment includes various image input devices such as image sensing devices including a digital still camera, digital video camera, and the like, and image readers including an image scanner, film scanner, and the like. The output device includes color monitors including a CRT, LCD, and the like, and image output devices including a color printer, film recorder, and the like.

As the interface, a general-purpose interface can be used. A serial interface such as RS232C, RS422, or the like, a serial bus such as IEEE1394, USB, or the like, or a parallel interface such as SCSI, GPIB, IEEE1284, or the like can be used depending on the use applications.

Also, input and output profiles required to perform color matching are stored in the HD 106. However, the present invention is not limited to the hard disk, and an optical disk such as a CD-R/RW, DVD±R/RW, or the like may be used.

An example of color matching executed using the input and output profiles will be described below.

Creation of Data Depending on Viewing Conditions 1

Figure 6:
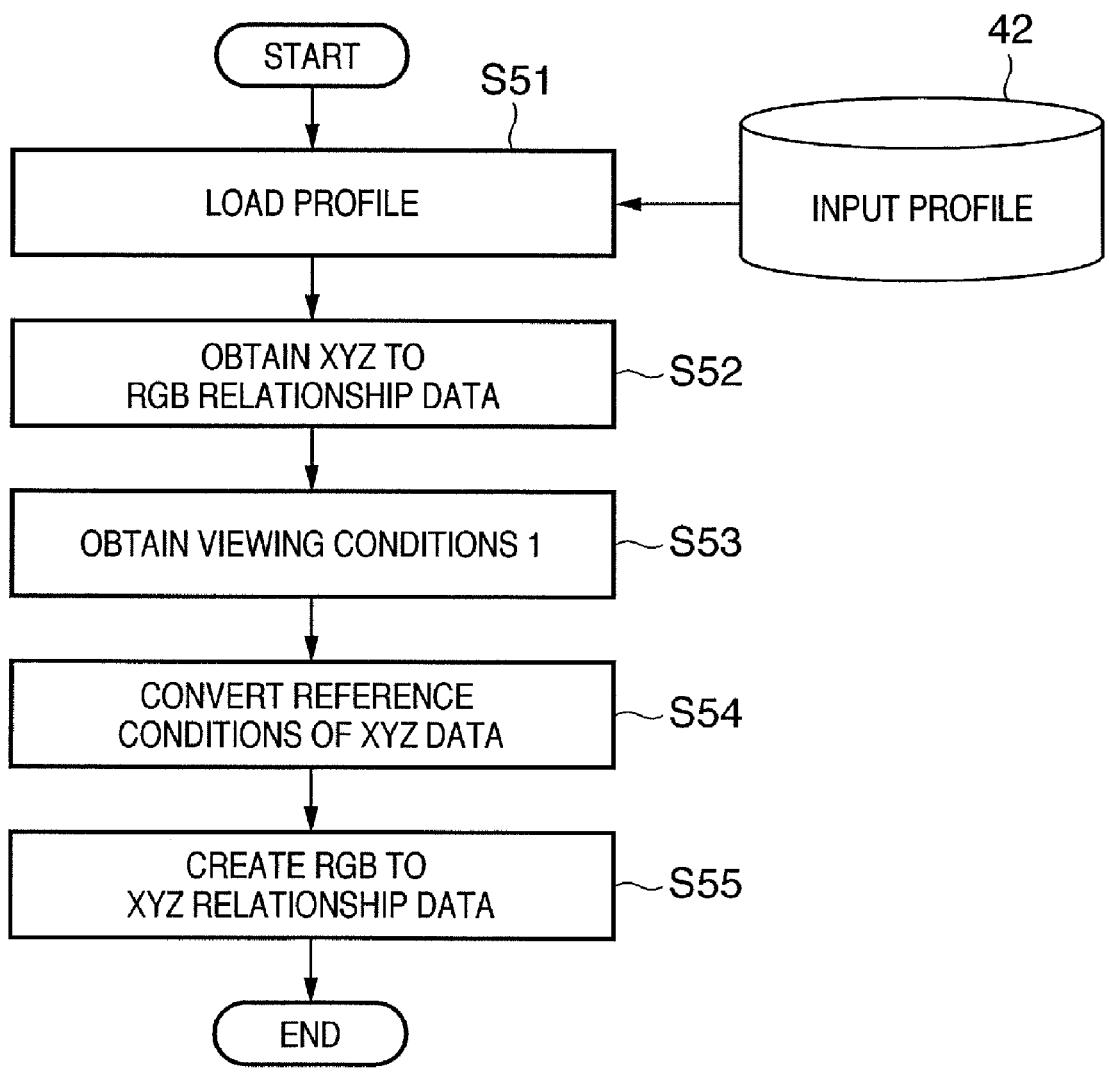
FIG. 6 is a flowchart showing processing for recreating a conversion LUT corresponding to ambient light.
Figure 7:
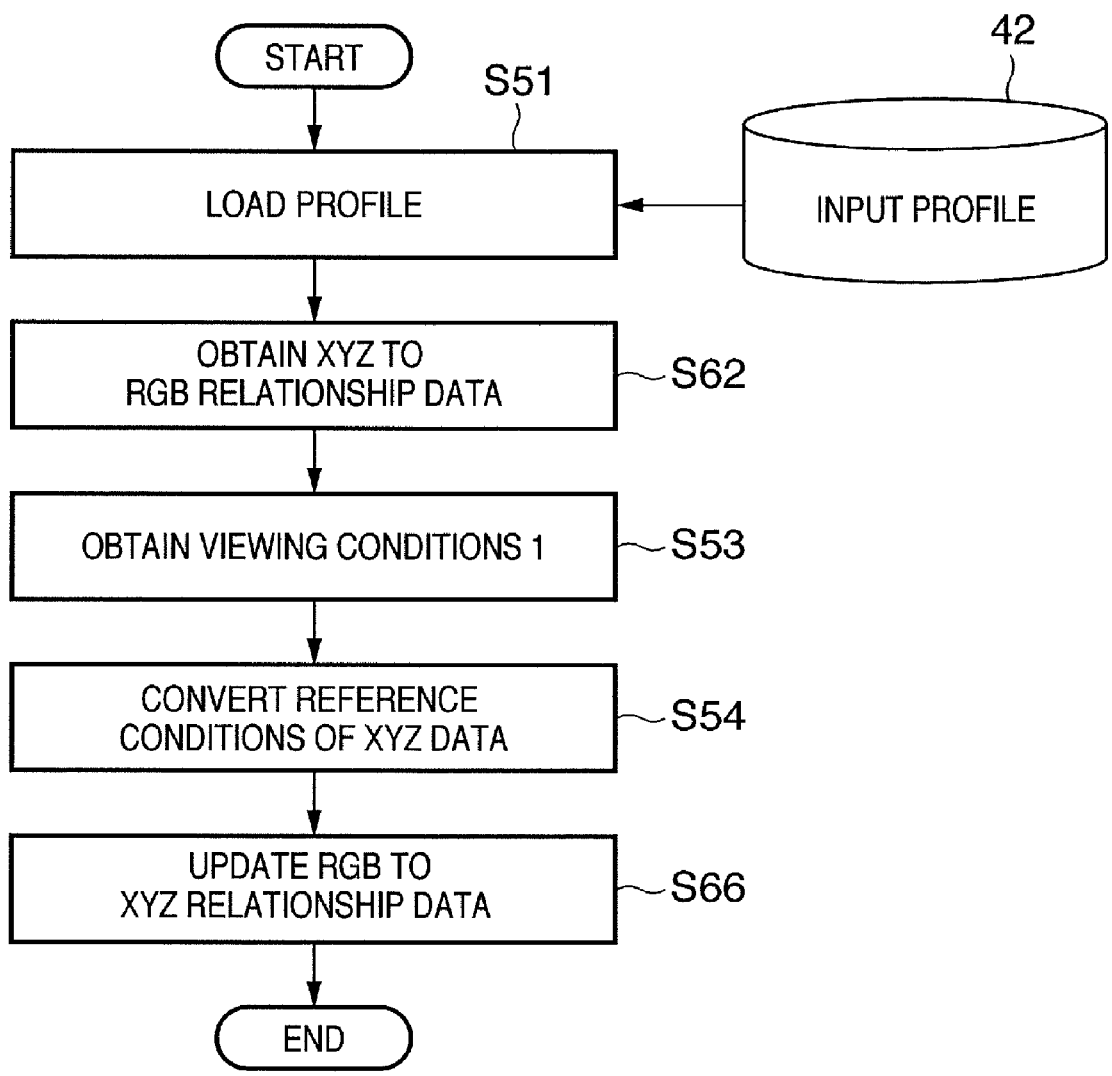
FIG. 7 is a flowchart showing processing for updating a conversion LUT corresponding to ambient light.

The conversion LUT 11 is created using the data creation unit 41. As a method of creating the conversion LUT 11, the following two methods are available. The first method is a method of recreating the conversion LUT 11 corresponding to ambient light based on the relationship between the XYZ values (or Lab values) of a color target and the RGB values of an input device, as shown in FIG. 6. The second method is a method of updating a conversion LUT used to convert a device RGB space into an XYZ space in the input profile 42 to the conversion LUT 11 corresponding to ambient light, as shown in FIG. 7.

FIG. 6 is a flowchart showing processing for recreating the conversion LUT 11 corresponding to ambient light.

In order to recreate the conversion LUT 11 corresponding to ambient light, a profile designated by the user is loaded from the input profile 42 (S51). The input profile 42 stores in advance XYZ to RGB relationship data that associates the XYZ values (or Lab values) of a color target with device RGB values upon reading that color target by the input device. This XYZ to RGB relationship data is extracted from the profile (S52). Since viewing conditions 1 are also stored in the profile, they are extracted from the profile (S53).

Since the XYZ values of the XYZ to RGB relationship data extracted in step S52 are data which are determined with reference to D50 or D65 as reference light upon measuring the color target, the XYZ values of a colorimetric light source reference must be corrected to those of an ambient light reference. Hence, the XYZ values of the colorimetric light source reference are converted into data on the human color appearance space JCH using the color appearance model based on the white point (in case of the D50 reference) of the D50 light source, the illuminance level, the state of surrounding light, and the like as the colorimetric conditions. Furthermore, the converted values are inversely converted again into XYZ values using the color appearance model based on, e.g., the white point of the D65 light source, the illuminance level, the state of surrounding light, and the like as viewing conditions 1 different from the colorimetric conditions, thus obtaining XYZ values of the ambient light reference (S54). In this way, the relationship between the XYZ values of the ambient light reference and device RGB values can be obtained. When an RGB to XYZ conversion matrix based on the XYZ to RGB relationship data is created, and is optimized by an iteration method or the like, a conversion LUT 11 corresponding to ambient light can be obtained (S55).

FIG. 7 is a flowchart showing processing for updating to the conversion LUT 11 corresponding to ambient light. Note that the same step numbers denote the steps that execute the same processing as in FIG. 6, and a detailed description thereof will be omitted.

In general, an ICC profile for an input device stores a conversion matrix (colorant Tag) or conversion LUT (AtoB0 Tag) required to perform RGB to XYZ conversion. Hence, RGB to XYZ relationship data is extracted from the input profile 42 (S62).

The relationship between the XYZ values of the ambient light reference and device RGB values is obtained (S54). Then, the conversion matrix (colorant Tag) or conversion LUT (AtoB0 Tag) in the input profile 42 is updated (S66). In this manner, the conversion LUT 11 corresponding to ambient light can be obtained.

Note that the example using the RGB to XYZ relationship data has been described in FIGS. 6 and 7. However, the present invention is not limited to this, and other device-independent color data such as RGB to Lab relationship data and the like may be used.

Selection of Color Space Compression Mode and Gamut Mapping

The color space compression mode is selected by the user via a user interface or is automatically selected by Rendering intent in the header of a profile on the source side. The color space compression mode is automatically selected based on the profile as follows.

"Perceptual" color space compression mode on the JCH color space,

"Relative Colorimetric" color space compression mode on the JCH color space,

"Saturation" color space compression mode on the JCH color space, and

"Absolute Colorimetric" color space compression mode on the QMH color space.

That is, the JCH space 13 is selected in case of relative color matching, and the QMH space 14 is selected in case of absolute color matching.

Figure 8:
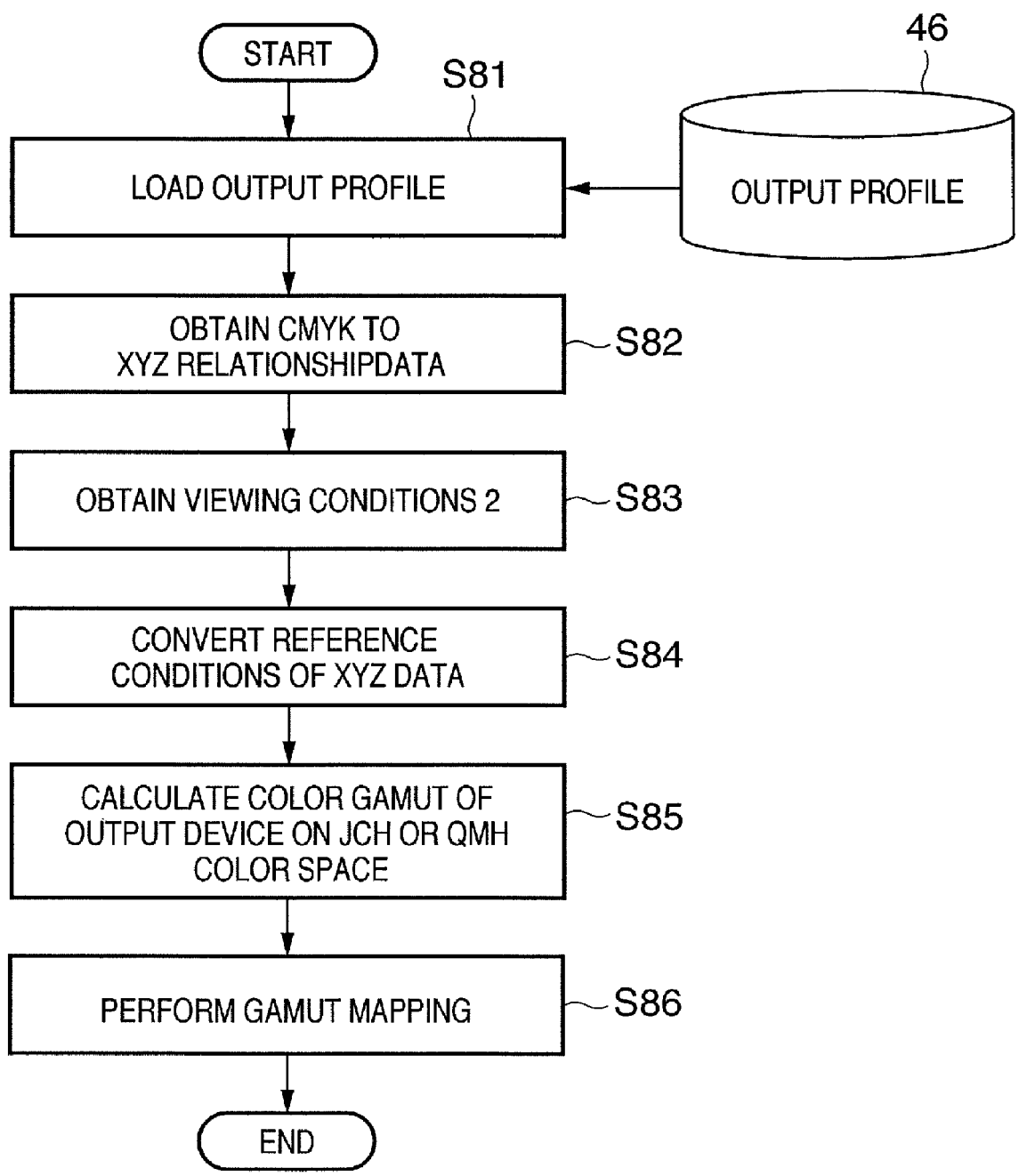
FIG. 8 is a flowchart showing processing for performing color space compression on a JCH or QMH color space.

FIG. 8 is a flowchart showing processing for performing gamut mapping on the JCH space 13 or QMH space 14.

In order to perform gamut mapping on the color appearance space, a profile designated by the user is loaded from the output profile 46 (S81).

In general, an ICC profile for an output device stores a determination LUT (gamut Tag) that inputs XYZ values or Lab values to determine if the values fall inside or outside of the color gamut (to be referred to as "color gamut inside/outside determination" hereinafter). However, since the XYZ values are determined with reference to D50 or D65 as the characteristics of the colorimetric light source, these values cannot be directly used in the color gamut inside/outside determination according to ambient light. Hence, the LUT (gamut Tag) for the color gamut inside/outside determination is not used. Instead, CMYK to XYZ relationship data is extracted from a conversion LUT (AtoB0 Tag or the like) used to perform CMYK to XYZ conversion, which is stored in the output profile 42 (S82), and the extracted data is used. Since the output profile 42 stores viewing conditions 2, viewing conditions 2 are extracted from the output profile 42 (S83).

Since the XYZ values of the CMYK to XYZ relationship data extracted in step S82 are data determined with reference to D50 or D65 as colorimetric light, these XYZ values must be corrected to those based on the ambient light reference. Hence, the XYZ values of a colorimetric light reference are converted into data on the human color appearance space JCH using the color appearance model based on the white point of the D50 light source (in case of the D50 reference), the illuminance level, the state of surrounding light, and the like as the colorimetric conditions. Then, the converted values are inversely converted again into XYZ values using the color appearance model based on, e.g., the white point of the D65 light source, the illuminance level, the state of surrounding light, and the like as viewing conditions 2 different from the colorimetric conditions, thus obtaining XYZ values of the ambient light reference (S84). In this way, in step S84 the relationship from device CMYK values to XYZ values of the ambient light reference is obtained. Next, the color gamut of the output device on the JCH or QMH color space is calculated based on the CMYK to ambient light XYZ relationship data obtained in step S84 (S85).

Figure 9:
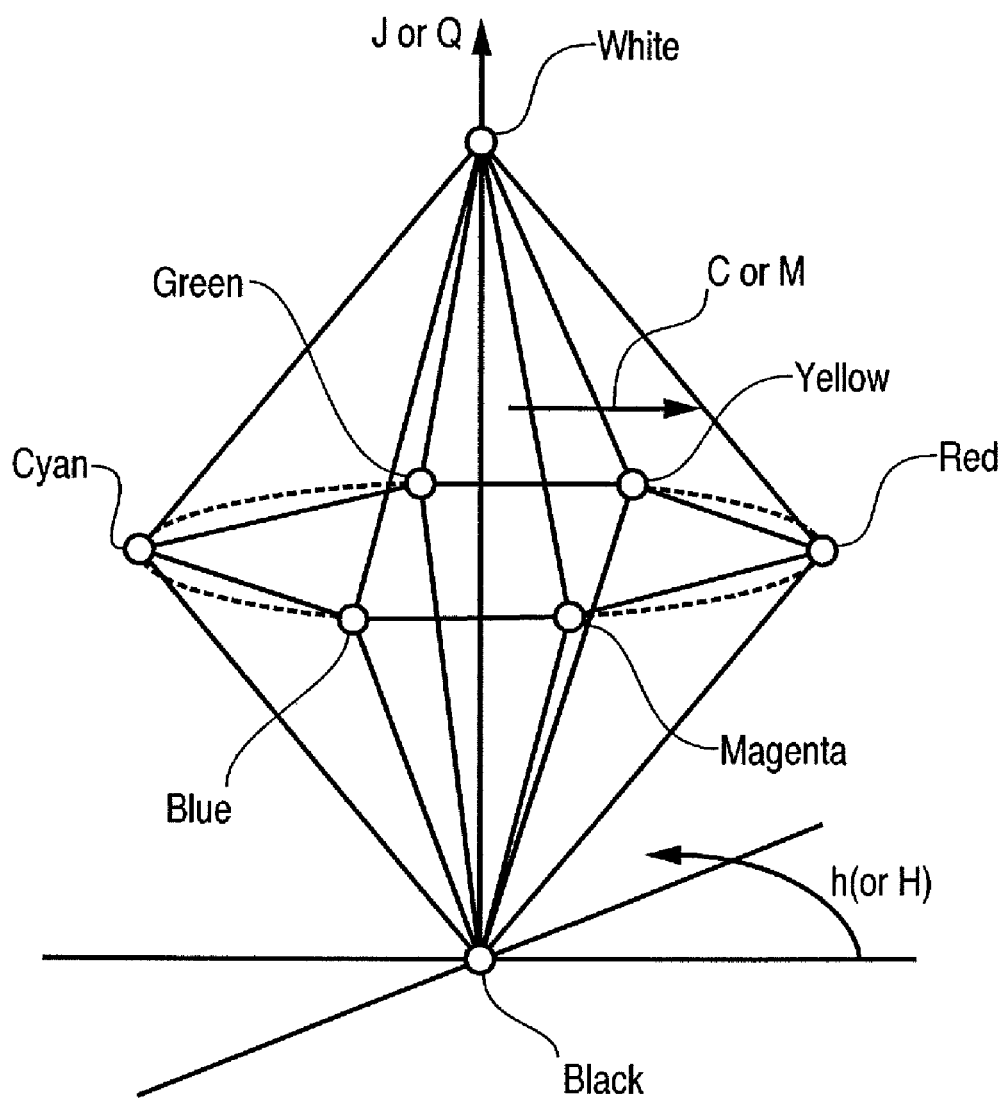
FIG. 9 shows a dodecahedron that approximates a color gamut.

For example, the XYZ values of the ambient light reference corresponding to the following eight points are calculated using the CMYK to ambient light XYZ relationship data obtained in step S84. Furthermore, by converting these XYZ values into coordinate values on the human color appearance space JCH or QMH based on viewing conditions 2 using the color appearance model, the color gamut of the output device on the JCH or QMH color space can be approximated by a dodecahedron shown in FIG. 9.

| Red     | (C: 0%, M: 100%, Y: 100%, K: 0%) |
| Yellow  | (C: 0%, M: 0%, Y: 100%, K: 0%)   |
| Green   | (C: 100%, M: 0%, Y: 100%, K: 0%) |
| Cyan    | (C: 100%, M: 0%, Y: 0%, K: 0%)   |
| Blue    | (C: 100%, M: 100%, Y: 0%, K: 0%) |
| Magenta | (C: 0%, M: 100%, Y: 0%, K: 0%)   |
| White   | (C: 0%, M: 0%, Y: 0%, K: 0%)     |
| Black   | (C: 0%, M: 0%, Y: 0%, K: 100%)   |

In the color gamut approximated by the dodecahedron, if a point inside the color gamut, i.e., an intermediate point between White and Black on the achromatic color axis and a point (JCH values or QMH values) of an input color signal which is to undergo inside/outside determination are located on the same side, it is determined that the input color signal falls inside the color gamut. If these points are located on the opposite sides, it is determined that the input color signal falls outside the color gamut.

Figure 10A:
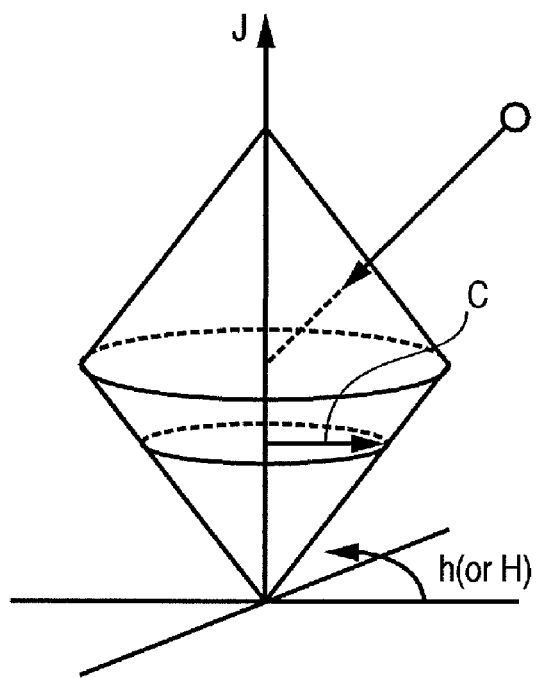
FIGS. 10A and 10B are views showing the concept of color space compression on a JCH color appearance space.
Figure 10B:
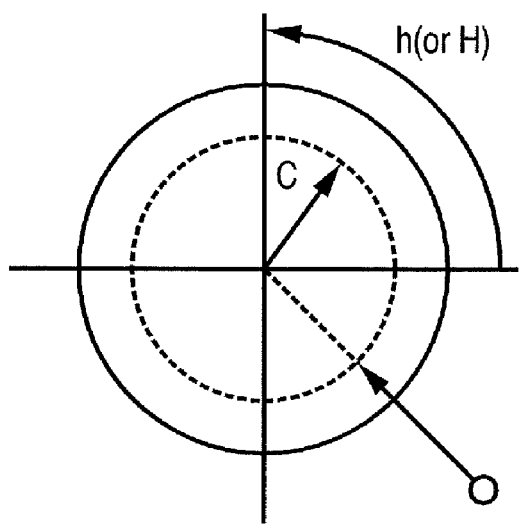
Figure 11A:
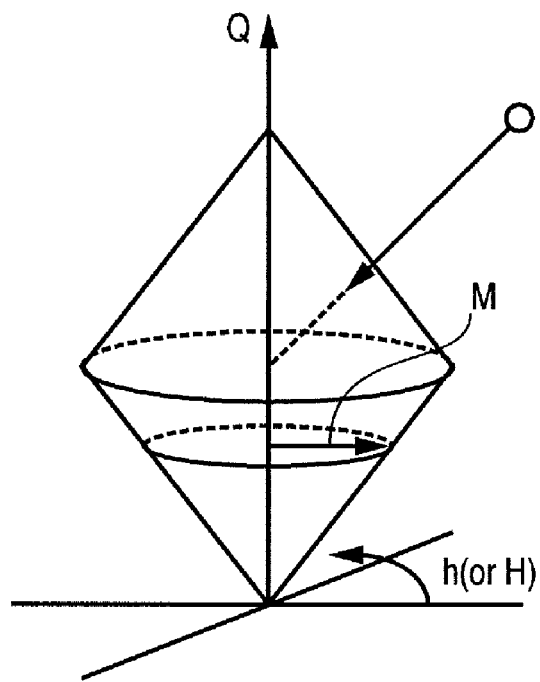
FIGS. 11A and 11B are views showing the concept of color space compression on a QMH color appearance space.
Figure 11B:
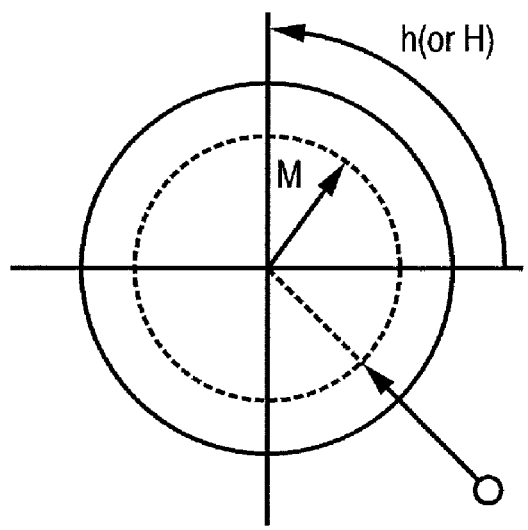

Based on the result of the color gamut inside/output determination in step S85, gamut mapping is executed (S86). FIGS. 10A and 10B show the concept of color space compression on the JCH color appearance space. FIGS. 11A and 11B show the concept of color space compression on the QMH color appearance space. An input color signal which is determined by the inside/output determination to fall outside the color gamut of the output device is mapped inside the color gamut to preserve a hue angle h (or H) on the JCH or QMH color appearance space. This mapping result is stored in an LUT which has the JCH color appearance space as an input/output color space in case of relative color matching, or in an LUT which has the QMH color appearance space as an input/output color space in case of absolute color matching.

Figure 12A:
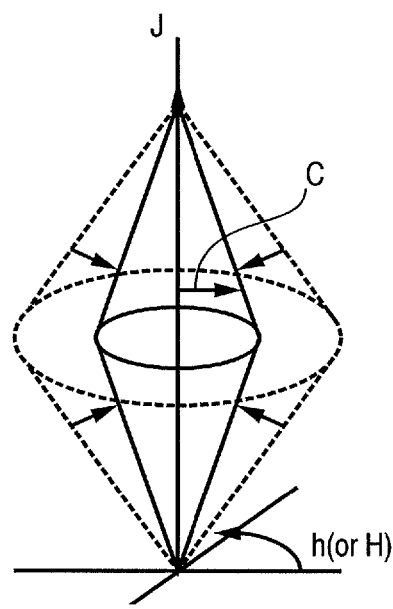
FIGS. 12A and 12B are views showing the concept of color space compression between different devices.
Figure 12B:
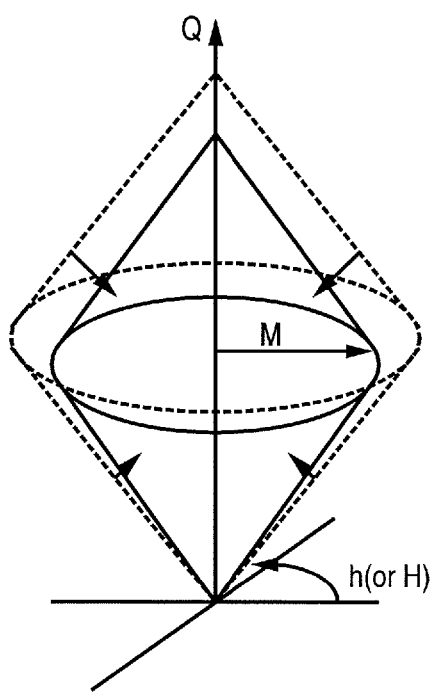

FIGS. 12A and 12B show the concept of gamut mapping between different devices. In FIGS. 12A and 12B, the broken line represents the color gamut of an input device, and the solid line represents that of an output device. On the JCH color appearance space, the level of J (lightness) is normalized based on the light source white points of viewing conditions 1 and 2 (to be abbreviated as "white point 1" and "white point 2" hereinafter in some cases), respectively. For this reason, J does not depend on the illuminance levels of viewing conditions 1 and 2 (to be abbreviated as "illuminance level 1" and "illuminance level 2" hereinafter in some cases). On the other hand, on the QMH color appearance space, the level of Q (brightness) changes depending on illuminance level 1 and illuminance level 2. Therefore, in relative color matching, white point 1 becomes white point 2 intact. On the other hand, in absolute color matching, if illuminance level 1>illuminance level 2, white point 1 is mapped on white point 2. On the other hand, if illuminance level 1<illuminance level 2, white point 1 is output as gray since it is lower than white point 2.

Creation of Data Depending on Viewing Conditions 2

The conversion LUT 16 is created using the data creation unit 47.

Figure 13:
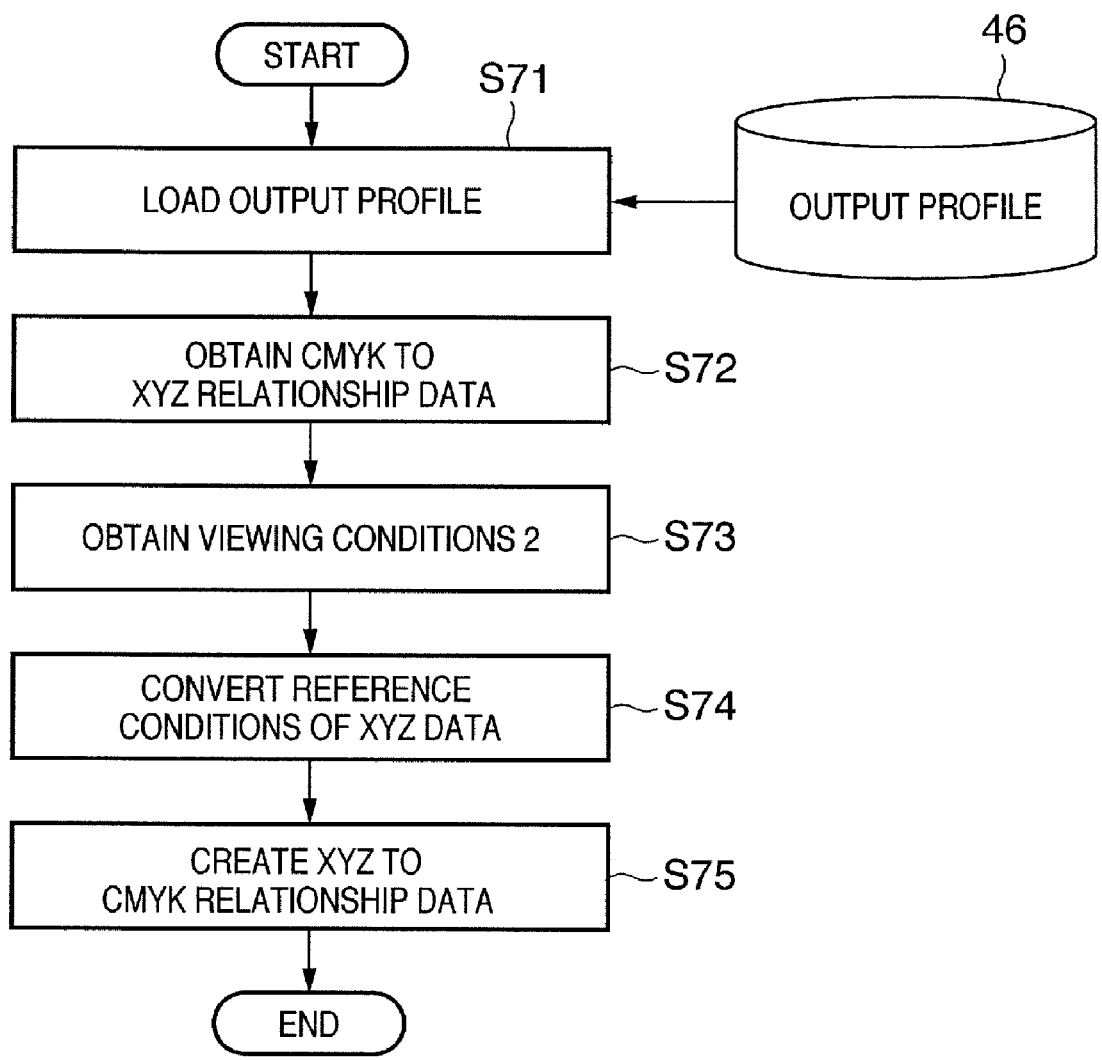
FIG. 13 is a flowchart showing processing for recreating a conversion LUT corresponding to ambient light.

FIG. 13 is a flowchart showing processing for recreating the conversion LUT 16 corresponding to ambient light.

In general, an ICC profile for an output device stores an LUT (BtoA0 Tag or the like) used to convert XYZ or Lab values into CMYK or RGB values of a device in a format including gamut mapping. However, since XYZ values to be input to the LUT are data which are determined with reference to D50 or D65, that LUT cannot be directly used as a conversion LUT according to ambient light.

Hence, as in gamut mapping, a conversion LUT (AtoB0 Tag or the like) used to perform CMYK to XYZ conversion stored in the output profile 46 is loaded (S71). Then, CMYK to XYZ relationship data is extracted from the conversion LUT (S72). Note that the CMYK values of the CMYK to XYZ relationship data may be other device-dependent colors such as RGB values and the like, and XYZ values may be other device-independent colors such as Lab values. Viewing conditions 2 stored in the output profile 46 are extracted (S73).

Since the XYZ values of the extracted CMYK to XYZ relationship data are data which are determined with reference to D50 or D65, the XYZ values of the colorimetric light source reference are corrected to those of the ambient light reference (S74). That is, using the color appearance model, the XYZ values of the colorimetric light source reference are converted into data on the human color appearance space JCH based on their colorimetric conditions (the white point of the D50 light source (in case of the D50 reference), the illuminance level, the state of surrounding light, and the like). Then, the converted values are inversely converted again into XYZ values based on viewing conditions 2 (the white point of the D65 light source, the illuminance level, the state of surrounding light, and the like), thus converting the XYZ values of the colorimetric light source reference into those of the ambient light reference. In this way, the relationship from device CMYK values to XYZ values of the ambient light reference can be obtained. When the ambient light XYZ to CMYK relationship data is optimized by an iteration method or the like using the CMYK to ambient light XYZ relationship data, a conversion LUT 16 corresponding to desired ambient light can be obtained (S75).

Execution of Color Matching

Figure 14:
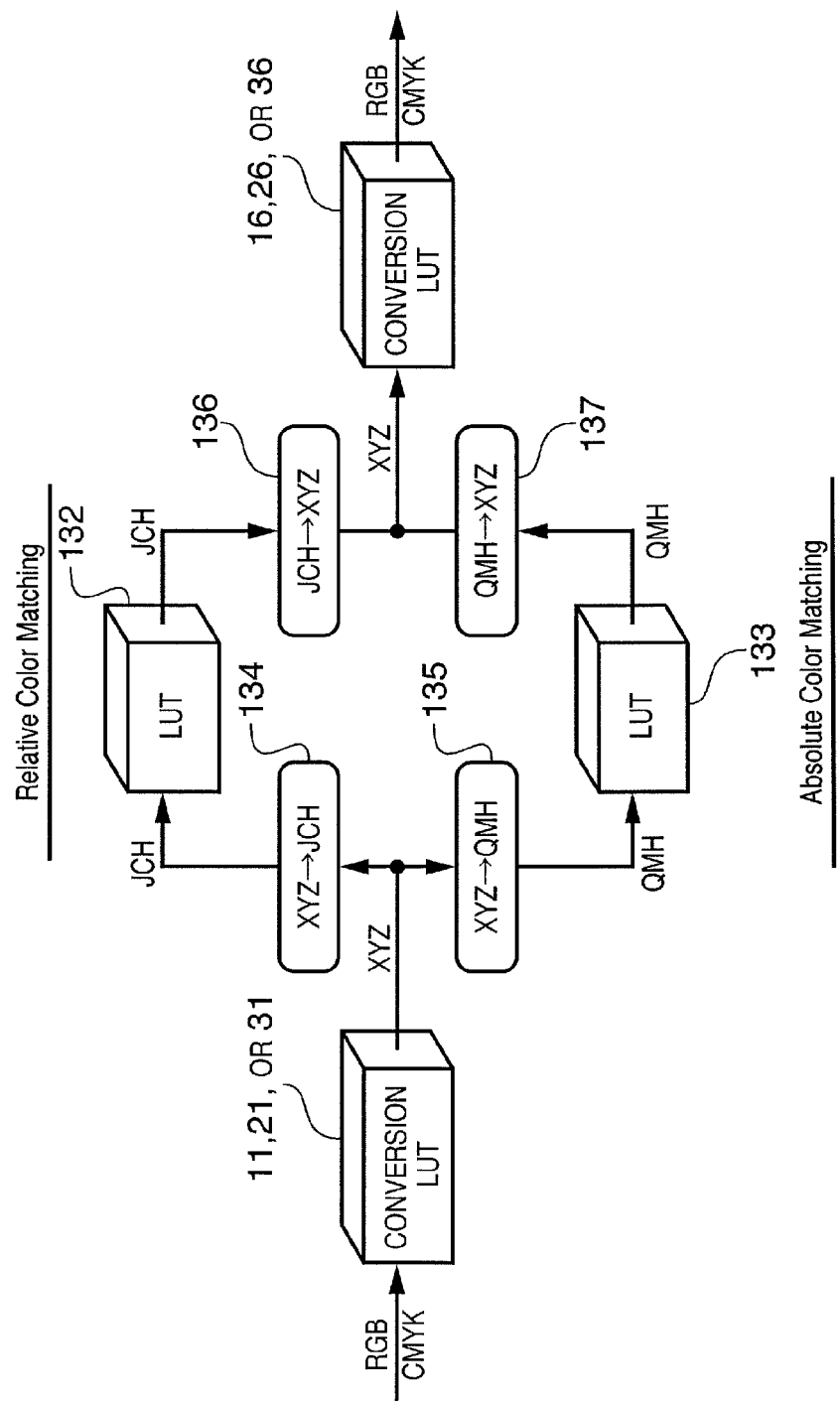
FIG. 14 is a view showing the concept of color matching processing.

FIG. 14 shows the concept of color matching processing.

The conversion LUT 11 is created by the data creation unit 41 based on viewing conditions 1. An LUT 132 is created by the gamut mapping unit 44 on the JCH color space. An LUT 133 is created by the gamut mapping unit 45 on the QMH color space. The conversion LUT 16 is created by the data creation unit 47 based on viewing conditions 2.

RGB or CMYK input color signals are converted from color signals of an input device into XYZ signals as device-independent color signals under viewing conditions 1 by the conversion LUT 11. Next, the XYZ signals are converted into human color appearance signals JCH or QMH based on viewing conditions 1 (the white point of the D50 light source, the illuminance level, the state of surrounding light, and the like) by a forward color appearance model converter 134 or 135. The JCH space is selected in case of relative color matching, or the QMH space is selected in case of absolute color matching.

The color appearance signals JCH and QMH are mapped within the color gamut of an output device by the LUTs 132 and 133. The gamut-mapped color appearance signals JCH and QMH are converted into XYZ signals as device-independent color signals under viewing conditions 2 by inverse color appearance model converters 136 and 137. Note that the inverse color appearance model converters 136 and 137 execute conversion based on viewing conditions 2 (the white point of the D65 light source, the illuminance level, the state of surrounding light, and the like). The XYZ signals are converted into color signals depending on the output device under viewing conditions 2 by the conversion LUT 134.

The RGB or CMYK signals obtained by the aforementioned processing are sent to the output device, and an image represented by the color signals is printed out. When this printout is viewed under viewing conditions 2, it appears to have the same tint as an original document viewed under viewing conditions 1.

[Color Matching between Device that Handles Object Colors and Device that Handles Light-source Colors]

Color matching processing between devices (digital camera, scanner, printer, and the like) that handle object colors of reflecting documents and the like, and devices (CRT, LCD display, projector, and the like) that handle light-source colors of monitors and the like will be described.

The arrangement and processing of color matching processing (color matching processing B) between devices that handle object colors and light-source colors are the same as the color matching processing (color matching processing A) between devices that handle object colors which has been described using FIGS. 3 to 14. Hence, a detailed description of the same arrangement and processing will be omitted.

The characteristic feature of color matching processing B lies in that the colorimetric conditions and viewing conditions are set in correspondence with a device that handles object colors of reflecting documents and the like, and a device that handles light-source colors of monitors and the like, respectively. Color matching processing B will be described in detail below using FIG. 15.

Viewing Conditions for Device that Handles Object Colors

In case of the object colors of reflecting documents and the like, since light obtained when ambient light is reflected by an object is perceived as colors, color appearance depends on ambient light. For viewing conditions 3 for a device that handles object colors, since it can be considered that the observer adapts himself or herself to ambient light, the XYZ values of ambient light are set as a white point of the viewing conditions.

Viewing Conditions for Device that Handles Light-source Colors

On the other hand, in case of light-source colors of monitors and the like, since a display device itself has a light source different from ambient light, light emitted by the display device (light reflected by a screen in case of a projector) is perceived as colors. When the display screen of the display device fully occupies the visual field of the observer, it can be considered that the observer adapts himself or herself to the light source of the display device. On the other hand, when the visual field includes the frame of a monitor or the like, the observer compares an image on the display device with that on a reflecting document in some cases. In these cases, it can be considered that the observer adapts himself or herself to a white point between the display light source and ambient light (to be referred to as "partial adaptation" hereinafter), and the influence of ambient light must be taken into consideration in addition to the light source of the display device.

Therefore, for viewing conditions 4 for a device that handles light-source colors, when the observer gazes at a display image, the XYZ values of a display device white point are set as a white point of the viewing conditions. On the other hand, when the observer compares an image on the display device with that on a reflecting document, a point between the XYZ values of the display device white point and those of ambient light is set as the XYZ values of a white point of the viewing conditions.

Colorimetric Conditions for Device that Handles Object Colors

Since the colorimetric conditions for a device that handles object colors require the XYZ values of the ambient color reference, the XYZ values of ambient light are set as a white point of the colorimetric conditions. Therefore, the white point of the colorimetric conditions for the device that handles object colors match that of the viewing conditions of the device that handles object colors.

If $R(\lambda)$ represents the spectral reflectance characteristics of an object, and $S(\lambda)$ represents the spectral reflectance characteristics of ambient light, we have $\Phi(\lambda)=R(\lambda)\cdot S(\lambda)$, and the XYZ values of the ambient light reference can be calculated by:

$$X = k\int_\lambda \Phi(\lambda)x(\lambda)d\lambda$$

$$Y = k\int_\lambda \Phi(\lambda)y(\lambda)d\lambda$$

$$Z = k\int_\lambda \Phi(\lambda)z(\lambda)d\lambda$$

$$k = 100/\int_\lambda S(\lambda)y(\lambda)d\lambda \qquad (1)$$

where $x(\lambda)$, $y(\lambda)$, and $z(\lambda)$ are color-matching functions.

That is, when the spectral reflectance characteristics for respective patches of device colors are stored in advance in a profile, and those of actual ambient light are acquired by an ambient light sensor or the like, the XYZ values of the ambient light reference can be dynamically calculated. Furthermore, a profile 21 corresponding to ambient light can be dynamically obtained using an iteration method or the like for the obtained relationship between the device colors and XYZ values. Note that the profile corresponding to ambient light, which is to be dynamically created, is not limited to that on the source side but it may be that on the destination side.

Colorimetric Conditions for Device that Handles Light-source Colors

On the other hand, since the colorimetric conditions for a device that handles light-source colors require the XYZ values of a display device light source reference, the XYZ values of a display device white point are set as a white point of the colorimetric conditions. Therefore, when the observer gazes at a display image, this white point matches that of the viewing conditions of the device that handles light-source colors. However, in case of partial adaptation, this white point does not match that of the viewing conditions of the device that handles light-source colors.

Let $\Phi(\lambda)$ be the spectral emission characteristics of the display device. Then, the XYZ values of the display device light source reference can be calculated by:

$$X = k\int_\lambda \Phi(\lambda) x(\lambda) d\lambda$$

$$Y = k\int_\lambda \Phi(\lambda) y(\lambda) d\lambda$$

$$Z = k\int_\lambda \Phi(\lambda) z(\lambda) d\lambda$$

$$k = 683 \ [\text{lumen}/W] \tag{2}$$

where $x(\lambda)$, $y(\lambda)$, and $z(\lambda)$ are color-matching functions.

As a profile 26 for the device that handles light-source colors, the same profile can be used even if the viewing conditions are changed, as long as there is no particular influence of ambient light due to reflection on the display device surface.

Color Matching Processing B

The profile 21 that uses the XYZ values of the ambient light reference is created for a device that handles object colors. The white point of ambient light is used as that of viewing conditions 3.

On the other hand, a profile 26 that uses the XYZ values of the display device light source reference is created for a device that handles light-source colors. As the white point of viewing conditions 4, the display device white point is used when the observer gazes at an image on the display device, and the white point between the display device white point and the white point of ambient light is used when the observer compares an image on the display device and that on a reflecting document.

Device color signals of the device that handles object colors are converted into device-independent color signals XYZ using the profile 21, and the converted signals are then converted into color appearance signals JCH or QMH by a forward color appearance model converter 22 using viewing conditions 3. Furthermore, the converted color appearance signals JCH or QMH are mapped within the color gamut of the destination side device on the JCH color space or QMH color space. The gamut-mapped color appearance signals JCH or QMH are converted into device-independent color signals XYZ by an inverse color appearance model converter 25 using viewing conditions 4, and the converted signals are converted into device color signals of the device that handles light-source colors using the profile 26.

Figure 15:
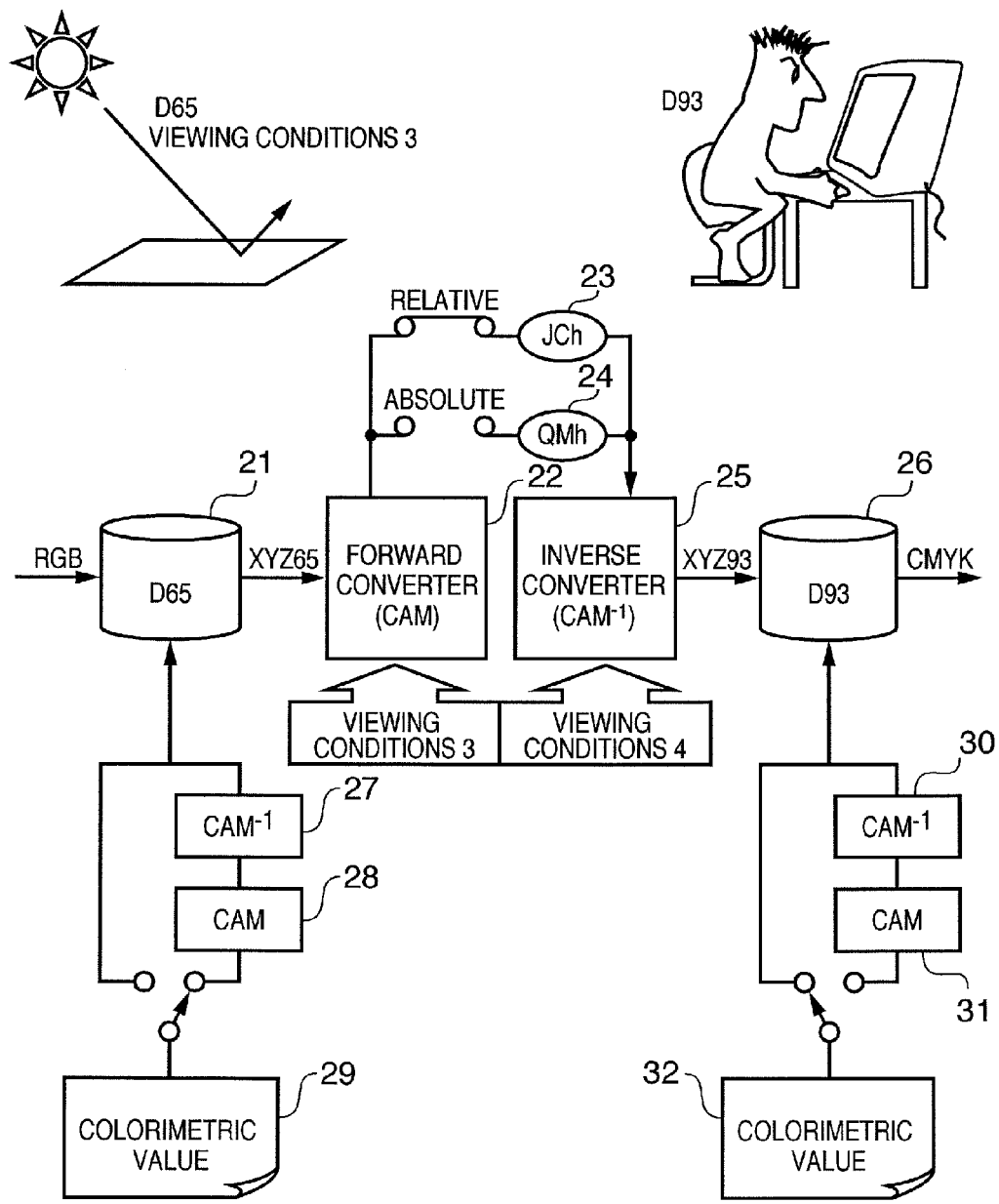
FIG. 15 is a view for explaining color matching processing between devices which handle object colors, and that which utilizes a colorimetric value file.

In the example of FIG. 15, the source side is a device that handles object colors, and the destination side is a device that handles light-source colors. On the contrary, the same processing can be applied when the source side is a device that handles light-source colors and the destination side is a device that handles object colors. Furthermore, the same processing can be applied even when both the source and destination sides are devices that handle light-source colors. That is, by appropriately setting the colorimetric conditions and viewing conditions depending on whether a device handles object colors or light-source colors, various combinations can be coped with.

Also, the profile for the device that handles object colors may store spectral reflectance characteristics for respective patches of device colors so as to generate the XYZ values of the ambient light reference.

[Color Matching Processing Using Colorimetric Value Files]

Color matching processing (color matching processing C) between devices that handle object colors and/or light-source colors using colorimetric value files will be described below. Note that a detailed description of the same arrangement and processing as those in the above description will be omitted. Note that the difference between color matching processing C and color matching processing A or B is that colorimetric value files are used in place of profiles.

In case of the device that handles object colors, the white value of the colorimetric conditions matches that of the viewing conditions. Therefore, when the colorimetric conditions prepared in advance are different from the viewing conditions, the colorimetric values of the viewing conditions are calculated from those of the colorimetric conditions using the color appearance model. Then, a profile is created based on the calculated colorimetric values.

On the other hand, in case of the device that handles light-source colors, the white point of the colorimetric conditions is that of the display device, and does not always match that of the viewing conditions. Therefore, a profile is created from the colorimetric values, and a white point for the viewing conditions is set according to the viewing situations.

Color matching processing C will be described below using FIG. 15.

A colorimetric value file 29 that utilizes the XYZ values of the ambient light reference is used for a device that handles object colors. When a colorimetric value file 32 that utilizes the XYZ values of the display device light source reference is used for a device that handles light-source colors, the profiles 21 and 26 can be directly created from the relationship with device colors by an iteration method or the like.

However, it is difficult to prepare for actual colorimetric values of the ambient light reference in advance. This is because various kinds of actual ambient light are considered, and it is impossible to prepare for colorimetric values corresponding to all these kinds of ambient light.

Hence, as the colorimetric value file for the device that handles object colors, colorimetric values of a standard light source (the D50 light source, A light source, or the like) reference are prepared in advance. Using the color appearance model, colorimetric values of the viewing conditions (the white point of ambient light, the illuminance level, the state of surrounding light, and the like) are calculated from those of the colorimetric conditions. More specifically, forward color appearance model conversion is applied to the colorimetric value file of the colorimetric conditions using the colorimetric conditions. Then, inverse color appearance model conversion is executed using the viewing conditions (viewing conditions 3: the white point of ambient light, the illuminance level, the state of surrounding light, and the like) to estimate the colorimetric values of the viewing conditions.

In this way, when the colorimetric conditions and viewing conditions are given to the forward color appearance model conversion and inverse color appearance model conversion to convert colorimetric values under the colorimetric conditions into those under the viewing conditions, predicted values of the XYZ values of the ambient light reference can be obtained.

As for the colorimetric value file of the device that handles light-source colors, since the colorimetric values of the display device light source reference need only be stored, they need not be converted according to the viewing conditions (ambient light).

Upon loading the colorimetric value file, whether a device that uses the colorimetric value file is the one that handles object colors or light-source colors is determined. In case of the device that handles object colors, the forward color appearance model conversion and inverse color appearance model conversion are applied to convert colorimetric values under the colorimetric conditions into those under the viewing conditions. When the colorimetric conditions match the viewing conditions, this conversion processing need not be executed.

In FIG. 15, the source side is a device that handles object colors, and the destination side is a device that handles light-source colors.

On the source side, it is determined that the device type is a device that handles object colors, and forward color appearance model conversion 28 according to the colorimetric conditions and inverse color appearance model conversion 27 according to the viewing conditions are applied to the colorimetric value file 29 to calculate colorimetric values according to the viewing conditions. Then, the profile 21 is created from the colorimetric values according to the viewing conditions. Input values undergo conversion using the profile 21 according to viewing conditions 3, and also forward color appearance model conversion 22 according to viewing conditions 3.

On the other hand, on the destination side, it is determined that the device type is a device that handles light-source colors, and the profile 26 is created from the colorimetric value file 32 according to the colorimetric conditions. That is, control is made not to apply forward color appearance model conversion 31 and inverse color appearance model conversion 30 to the colorimetric value file 32. Then, inverse color appearance model conversion 25 is executed according to viewing conditions 4, and conversion using the profile 26 is executed according to the colorimetric conditions of the colorimetric value file 32.

When the display screen of the display device fully occupies the visual field of the observer, it can be considered that the observer adapts himself or herself to the light source of the display device. Hence, the same conditions as the colorimetric conditions are set as viewing conditions 4. On the other hand, when the frame or the like of a monitor is included in the visual field, or when the observer compares an image on the display device with that on a reflecting document, a white point between the light source (colorimetric conditions) of the display device and ambient light is set as viewing conditions 4.

In this manner, according to FIG. 15, the profiles can be appropriately calculated from the colorimetric values in correspondence with the device types.

Modification of Embodiment

In the example of the above description, the colorimetric value file is converted prior to creation of the profile. However, by applying similar colorimetric value conversion upon conversion of color signals after creation of the profile, desired XYZ values of the ambient light reference may be obtained.

As the colorimetric value data 29 for the device that handles object colors, the spectral reflectance characteristics may be stored in place of the XYZ values of the ambient light reference.

Upon converting the colorimetric values of the colorimetric conditions into those according to the viewing conditions (the inverse color appearance model conversion 27 or 30, and the forward color appearance model conversion 28 or 31), only white points are used in comparison between the colorimetric conditions and viewing conditions in some cases. In such case, color adaptation conversion may be used in place of the inverse color appearance model conversion and the forward color appearance model conversion.

As the color appearance model in the above embodiment, CIECAM97s, CIECAM02, CIECAT02, CIECAT94, Bradford conversion, Von Kries conversion, and the like may be used.

The color spaces (e.g., RGB, XYZ, JCh, and QMh) of color signals in the above embodiment are merely examples of color spaces that can be used, and other color spaces such as CMYK, Lab, and the like may be used.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-182521 filed on June 22, 2005, which is hereby incorporated by reference herein in its entirety.

The invention claimed is:

1. A method of generating a profile used in conversion between device-dependent color data and device-independent color data from a file which stores colorimetric values of a device, the method comprising:
   using a processor to perform the steps of:
   obtaining at least one viewing condition;
   converting the colorimetric values under a colorimetric condition stored in the file into colorimetric values under the viewing condition;
   determining a type of the device from the colorimetric condition of the colorimetric values stored in the file; and
   generating the profile based on a determination result obtained in the determining step,
   wherein the generating step includes generating the profile using the colorimetric values under the colorimetric condition stored in the file when the type of the device is a device that handles light-source colors, and generating the profile using the colorimetric values under the viewing condition obtained in the converting step when the type of the device is a device that handles object colors.

2. The method according to claim 1, wherein the obtaining step includes obtaining a white point, between a white point of the device and a white point of ambient light, set as the viewing condition in a case of the device that handles the light-source colors.

3. The method according to claim 1, wherein said converting step includes performing forward conversion according to the colorimetric condition and inverse conversion according to the viewing condition.

4. The method according to claim 1, wherein the generating step includes generating the profile using the colorimetric values under the colorimetric condition stored in the file when the type of the device is the device that handles the object colors and the colorimetric condition match the viewing condition.

5. A non-transitory computer-readable storage medium retrievably storing a computer program comprising program code for causing a computer to perform a method of generating a profile used in conversion between device-dependent color data and device-independent color data from a file which stores colorimetric values of a device, the method comprising the steps of:

obtaining at least one viewing condition;

converting the colorimetric values under a colorimetric condition stored in the file into colorimetric values under the viewing condition;

determining a type of the device from the colorimetric condition of the colorimetric values stored in the file; and generating the profile based on a determination result obtained in the determining step, wherein the generating step includes generating the profile using the colorimetric values under the colorimetric condition stored in the file when the type of the device is a device that handles light-source colors, and generating the profile using the colorimetric values under the viewing condition obtained in the converting step when the type of the device is a device that handles object colors.

6. A color processing apparatus for generating a profile used in conversion between device-dependent color data and device-independent color data from a file which stores colorimetric values of a device, the apparatus comprising:

an obtainer unit constructed to obtain at least one viewing condition;

a converter unit constructed to convert the colorimetric values under a colorimetric condition stored in the file into colorimetric values under the viewing condition;

a determiner unit constructed to determine a type of the device from the colorimetric condition of the colorimetric values stored in the file; and a generator unit constructed to generate the profile based on a determination result provided by the determiner, wherein the generator unit generates the profile using the colorimetric values under the colorimetric condition stored in the file when the type of the device is a device that handles light-source colors, and generates the profile using the colorimetric values under the viewing condition provided by the converter unit when the type of the device is a device that handles object colors.

* * * * *